Aug. 18, 1970     F. HANDLEY     3,524,259
SPIRIT LEVEL
Filed Oct. 10, 1968
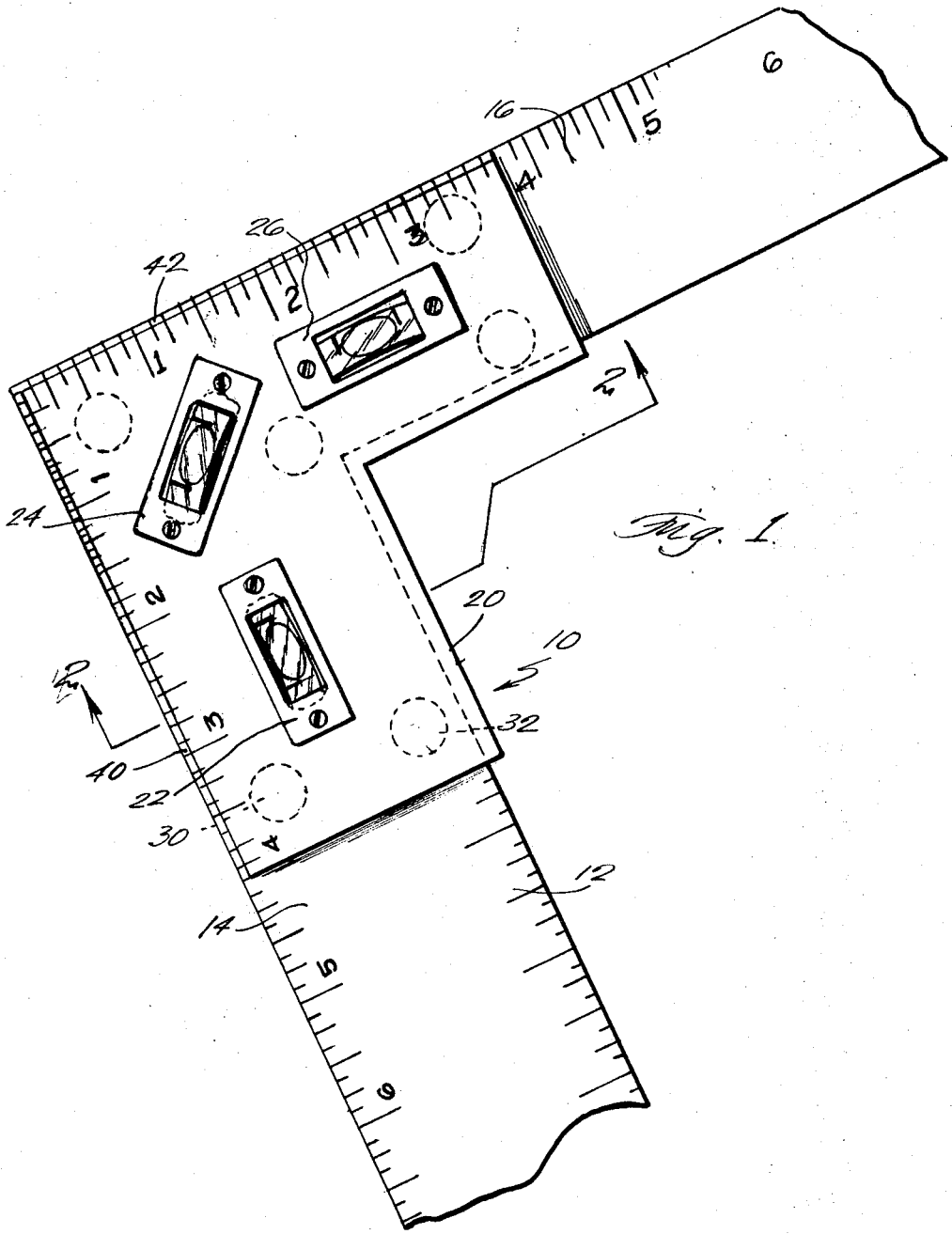
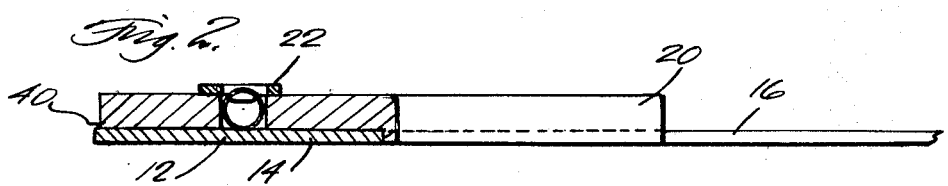
INVENTOR.
FREDERICK O. HANDLEY
BY
*Victor J. Evans & Co.*
ATTORNEYS

United States Patent Office 3,524,259
Patented Aug. 18, 1970

3,524,259
SPIRIT LEVEL
Frederick Offutt Handley, Sherwood Lane,
Richmond, Mo. 64085
Filed Oct. 10, 1968, Ser. No. 766,522
Int. Cl. G01c 9/28
U.S. Cl. 33—89                                        1 Claim

ABSTRACT OF THE DISCLOSURE

A spirit level having a multiple arrangement of bubbles, one for indicating the angularity disposed on a rafter pitch, and the other two for plumb, and in which the multiple bubbles are disposed in an overset means secured to the intersecting portions of the legs or arms of a square.

---

The present invention relates to an improved spirit level, and more particularly the invention relates to an attachment or accessory used in conjunction with a carpenter's or builder's metal square, in which there are disposed multiple bubbles, two for plumb, and one angularly disposed for rafter pitch.

There is within the purview of the present invention means for disposing an overset means on the angular portion of a carpenter's square, in which there is a recessed flanged portion along the adjacent edges of the square and the overset means so the linearity means of the square is not impeded with, and in which the recess is on the inside and projects downwardly to engage the corner edges of the square.

The overset means may be comprised of magnetic material employed for holding the overset means onto the metal square and thereby maintain it in position thereon.

A further object of the present invention is to provide an improved attachment of parts for a square in which the spirit level is carried thereon and is disposed for providing for 0 degrees, 45 degrees and 90 degrees indication, with respect to a horizontal plane oriented with respect to the horizon, as effected by the force due to the gravity.

The above and other objects and advantages of the invention will become apparent from full consideration of the following detailed description, and accompanying drawings, in which:

FIG. 1 shows a perspective view of a preferred embodiment of the spirit level of the present invention; and FIG. 2 is a cross-sectional view around lines 2—2 of FIG. 1.

Referring now to the drawing, there is shown a spirit level 10 comprising a right-angled square 12 having arms 14, 16 extending from the angular formed portion thereof, and which are constructed of metal. Disposed over the intersecting or angular portion thereof is an overset means 20, which is secured to the angular portion of the square proximate to the intersection of said arms, and in which there are measuring indicia disposed along the linear edges of said arms. The measuring indicia are shown in FIG. 1.

Within the overset means 20, there are disposed and arranged at least three series of bubbles 22, 24, 26 which are secured to the overset means and which provide indicia or indication of the corner within the inset of the square, or other surface to which the square may be applied, as to its being oriented with respect to a horizontal gravitational plane of 0 degrees, 45 degrees, or 90 degrees.

It is within the purview of the present invention to provide magnets 30, 32 along and disposed within the overset means for orienting and securing the overset means onto the metal square. The means 30 may also be any other securing means well known in the art.

There is disposed around outer surfaces adjacent the square and the overset means a beveled recess 40, 42, disposed so that it does not provide interference between the overset means and the contacting surface of the square including the legs 14, 16. While the beveled recess 40, 42 are disposed on the outside corner of the square, it is also seen that the overset has flanges 44, 46, as shown in FIG. 2, extending along the edges of the overset means 20 along the inside corner of the square. The width of the overset is less than the width of the arm of the square so that a portion of the arm is visible, that is, not covered by the overset means 20.

Additional embodiments of the invention in this specification will occur to others and therefore, it is intended that the scope of the invention be limited only by the appended claim and not by the embodiments described hereinabove. Accordingly, reference should be made to the following claim in determining the full scope of the invention.

What is claimed is:

1. A spirit level comprising a right-angled square having arms extending therefrom and constructed of metal, an overset means having an outside corner and an inside corner secured to the square near the intersection of said arms forming said square and forming also an outside corner and an inside corner, measuring indicia disposed upon linear edges of said arms, a plurality of bubble levels mounted within said overset means disposed and arranged to provide indication of the angular variance of said spirit level from a horizontal plane parallel to the ground, two of said bubble levels being perpendicular to each other and a third of said bubble levels being positioned at a 45° angle with said perpendicular bubble levels so that said arms and said corners of said square will all be in a horizontal plane parallel with the ground and perpendicular to the corner surfaces which said square is placed against, said overset means being held onto the level by magnetic material within said overset means, and a beveled recess formed between the edge having measuring indicia and the outside edge of said overset means.

References Cited

UNITED STATES PATENTS

| | | | |
|---|---|---|---|
| 1,022,396 | 4/1912 | Allen | 33—89 |
| 1,225,132 | 5/1917 | Johnson | 33—89 |
| 1,241,341 | 9/1917 | Chambers | 33—89 |
| 1,264,146 | 4/1918 | Beydler | 33—63 |
| 2,454,133 | 11/1948 | Buchhorn. | |
| 2,789,363 | 4/1957 | Miley. | |
| 2,790,069 | 4/1957 | Alexander | 33—207 X |

HARRY N. HAROIAN, Primary Examiner

U.S. Cl. X.R.
33—207